United States Patent [19]

Waller

[11] Patent Number: 4,938,975

[45] Date of Patent: Jul. 3, 1990

[54] FOOD PRODUCT AND METHOD OF MAKING SAME

[76] Inventor: Roland Waller, 54 Hubbard St., Chicago, Ill. 60610

[21] Appl. No.: 241,035

[22] Filed: Sep. 6, 1988

[51] Int. Cl.⁵ .................. A23L 1/00; A21D 13/00
[52] U.S. Cl. ............................ 426/91; 426/92; 426/94; 426/134; 426/297; 426/421; 426/75
[58] Field of Search ............... 426/134, 91, 421, 297, 426/92, 94, 75

[56] References Cited

U.S. PATENT DOCUMENTS

| | | | |
|---|---|---|---|
| 1,623,926 | 4/1927 | Kohler | 426/134 |
| 1,652,789 | 12/1927 | Moore | 426/134 |
| 1,720,190 | 7/1929 | Van Horne | 426/134 |
| 1,786,606 | 12/1930 | Gordon | 426/91 |
| 1,835,719 | 12/1931 | Parr | 426/134 |
| 1,867,945 | 7/1932 | Hunter | 426/134 |
| 2,001,919 | 5/1935 | Nolte | 426/134 |
| 2,240,522 | 5/1941 | Serr | 426/92 |
| 2,429,353 | 10/1947 | Gibson | 426/91 |
| 2,632,708 | 3/1953 | Sueskind | 426/134 |
| 2,677,615 | 5/1954 | Sueskind | 426/134 |
| 2,927,544 | 3/1960 | Kolander | 426/421 |
| 3,143,424 | 8/1964 | Wilson | 426/92 |
| 3,410,691 | 11/1968 | Stanley | 426/94 |
| 3,551,161 | 12/1970 | Whitestone | 426/92 |
| 3,615,678 | 10/1971 | Tangel et al. | 426/94 |
| 3,656,968 | 4/1972 | Allen | 426/92 |
| 3,804,956 | 4/1974 | Bongiovanni | 426/134 |
| 3,950,548 | 4/1976 | Baker | 426/134 |
| 4,139,644 | 2/1979 | Stephenson | 426/421 |
| 4,144,356 | 3/1979 | McDeniel | 426/134 |
| 4,313,961 | 2/1982 | Tobia | 426/92 |
| 4,399,156 | 8/1983 | Bernal | 426/134 |
| 4,400,404 | 8/1983 | Persi | 426/92 |
| 4,447,457 | 5/1984 | Bernal | 426/134 |
| 4,517,203 | 5/1985 | Levinie et al. | 426/94 |
| 4,661,361 | 4/1987 | Mongiello et al. | 426/94 |
| 4,687,670 | 8/1987 | Rodriguez | 426/94 |
| 4,753,813 | 6/1988 | Saadia | 426/94 |

FOREIGN PATENT DOCUMENTS

| | | | |
|---|---|---|---|
| 0220748 | 5/1987 | European Pat. Off. | 426/134 |
| 711896 | 10/1941 | Fed. Rep. of Germany | 426/134 |
| 1918996 | 10/1970 | Fed. Rep. of Germany | 426/92 |
| 894326 | 4/1943 | France | 426/134 |
| 2099014 | 3/1972 | France | 426/91 |
| 2508767 | 1/1983 | France | 426/134 |
| 62-14765 | 1/1987 | Japan | 426/134 |
| 610746 | 5/1979 | Switzerland | 426/134 |
| 198282 | 5/1923 | United Kingdom | 426/134 |

OTHER PUBLICATIONS

Chinese Technique, Ken Hom, 1981, pp.246-252, 294-317.

*Primary Examiner*—Steven Weinstein
*Attorney, Agent, or Firm*—Balogh, Osann, Kramer, Dvorak, Genova & Traub

[57] ABSTRACT

A method of preparing a food product, such as a pizza, supported on a handle held by a diner while being eaten. Pizza dough is prepared and then rolled out into sheets of dough which are cut into rectangular-shaped pieces. A handle with a disc is laid within one longitudinal margin of the piece. Two longitudinal margins and one transverse margin are moistened to develop adhesiveness. The central portion of the piece is filled with a food filler abutting the disc. The unmoistened margin is lapped over the food filler to form a generally cylindrical pouch. The transverse moistened margin is lapped over the unmoistened margin to form a seal. The upper longitudinal margin is crimped together to seal the pouch at the top, and the lower longitudinal margin is crimped against the disc and the handle to provide good support of the food product on the handle. Thereafter, the formed food product is heated for a predetermined time to form an edible pizza.

4 Claims, 1 Drawing Sheet

FOOD PRODUCT AND METHOD OF MAKING SAME

BACKGROUND OF THE INVENTION

The present invention relates to a food product and method of making the food product.

Presently, a food product such as a "corn dog" is known in the art. This product utilizes a hot dog or frankfurter which forms an inner core of the product and is surrounded by an outer edible layer of dough or corn meal, which is subsequently cooked in a oil bath or in an oven, the product being supported on a stick which acts as a carrier or handle. This type of food product is devoid of any condiments which applied to the surface would run off the surface of the cooked dough.

The problem of the lack of condiments has been solved in U.S. Pat. No. 3,656,968, wherein a frankfurter or wiener is wrapped in dough with a skewer positioned longitudinally along the wiener and dough covering, and then placed in a mold for baking. Upon completion of the baking, the skewer is withdrawn, thereby providing a cavity for insertion of a condiment.

Another food product is disclosed in U.S. Pat. No. 4,447,457, which shows a burrito-type product on a stick. In preparing this product, a tortilla is spread out on a surface, and a stick is inserted at one edge of the tortilla and wrapped around the stick one or more times. Thereafter, a food filler in spread on the remaining portion of the tortilla, and then the outer edges of the tortilla are lapped over to enclose the food filler in a pouch formed by the free edge of the tortilla rolled on the stick.

None of the known methods described in the foregoing disclosures are adequate for preparing and processing a food product made of dough filled with food fillers associated with a pizza product.

SUMMARY OF THE INVENTION

The present invention relates to an improved food product and a method of making the product.

The product of the present invention comprises a food filler encapsulated in an outer crust and supported on a handle to which is fitted a disc.

A feature of the present invention is that the food product is supported on a handle provided with a disc embedded in the crust, the handle extending not at all, or only minimally into the body of the product.

Another feature of the invention relates to the increased safety of the product, since the incorporation of a disc and handle or stick structure in combination with a crimped cooked dough affords sufficient rigidity and self-support of the product without the need to extend the stick into the product beyond the disc, so as to present the possibility of stick-biting injury while the product is being eaten.

Another feature of the invention is to provide a food product formed from a sheet of dough which is substantially covered with a pizza-type food filler, and then the sheet is rolled over a disc attached to a handle or stick to form a food filler cavity sealed by the outer edges of the dough sheet for subsequent heat treatment.

A further feature of the invention is the provision of a method for making the product of the present invention.

Further features will become fully apparent in the following description of the embodiments of this invention and from the appended claims.

DETAILED DESCRIPTION OF THE PRODUCT AND PROCESS

Figure 1:
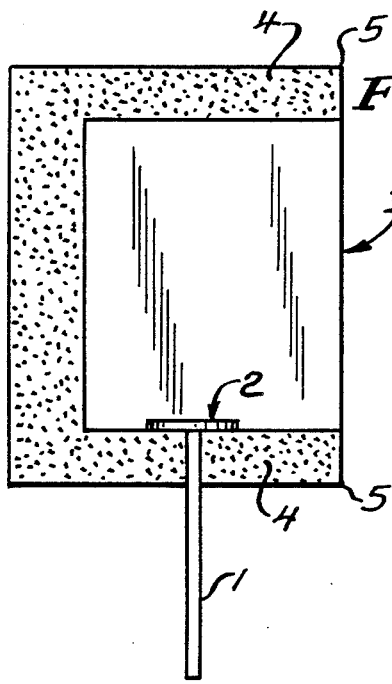
FIGS. 1 to 6 are plan views of the components during the various stages of the forming process of the product.
Figure 2:
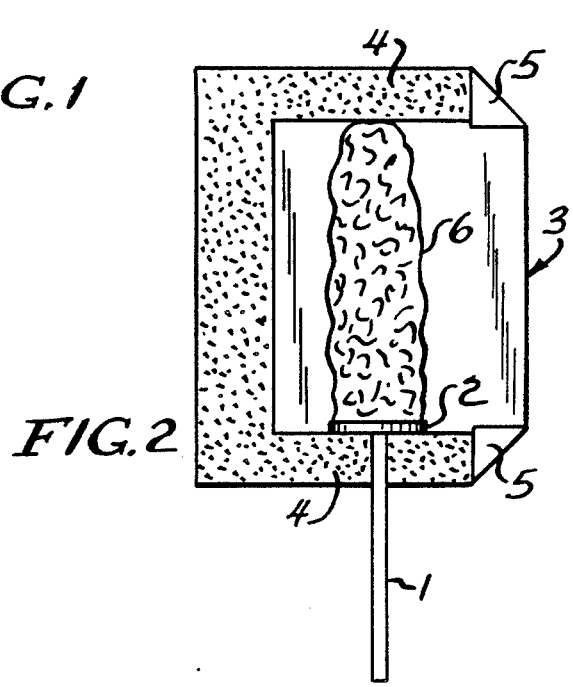
Figure 3:
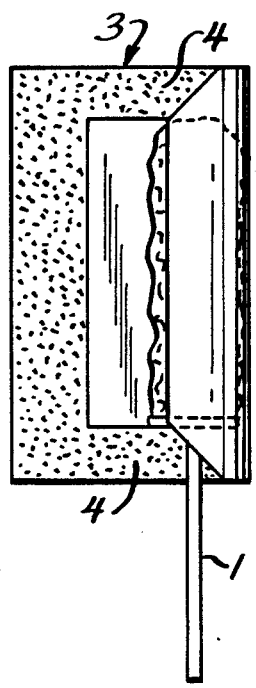
Figure 4:
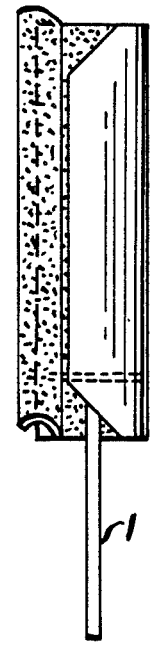
Figure 5:
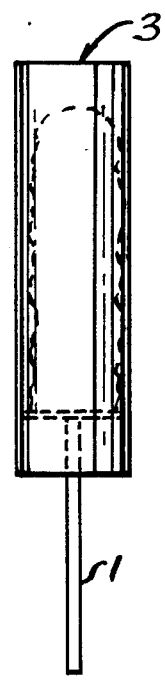
Figure 6:
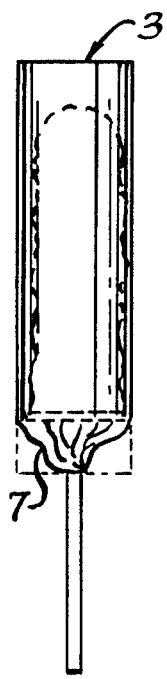
Figure 7:
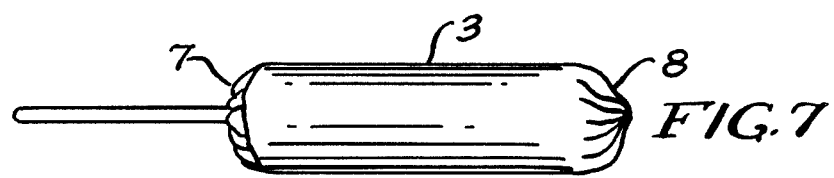
FIG. 7 is an isometric view of the completed product.

Using any one of the known recipies, a pizza dough is prepared and worked with the hands until the dough reaches elasticity and can be worked without excessive sticking to the hands. The dough is then rolled into a flat sheet about one-quarter of an inch thick and having a circular form of about 16 inches in diameter. The rolled-out sheet is cut into six segments, by making a vertical diametrical cut followed by two transverse cuts across the width of the sheet, each segment having approximately the same area so that the six segments of the dough can be further rolled into individual rectangular sections having a size of about 6 and ½ inches by 4 inches. Each section is then cut transversely across the longitudinal axis to provide a pair of pieces (3), each being approximately 3 and ¼ inches by 4 inches in size.

Thereafter, each piece is laid out on a working surface, and a handle or stick (1) supporting a disc (2) is placed on the dough piece with the disc touching the piece about ½ inch over the margin of the shortest side of the piece. Then, the long margin and the two short margins (4) are moistened for about ½ inch of their edges with water, thereby creating a softening of the dough to permit and generate adhesiveness for the purpose to be described hereinafter. The corners (5) of the piece adjoining and partially developed by the unmoistened margin are tucked inwardly to overlap the moistened portions of the two opposing margins.

At this time, a mixture of food filler (6) comprising, for example, a quantity of precooked meat or sausage and/or uncooked vegetables (peppers, mushrooms, chopped olives, etc.) and sauce and cheese is spread over the central area of the dough piece, and abutting the disc resting on the piece. Grasping the unmoistened margin of the dough piece, the margin is overlaid over the food filler (6) and placed in a partial contact with the opposing moistened margin to form a pouch containing the food filler. Then, the opposed moistened margin is overlapped slightly over the unmoistened margin to define a good seal. With the foregoing being completed, the moistened margin, distantly located from the disc, is brought together to form a seal to prevent escape of the food filler. Thereafter, the moistened margin adjacent the disc is crimped inwardly against the disc (2) and the handle (1) as shown at (7) to form an adequate support for the disc on the handle.

The moistened margin of the dough piece (3) is tightly crimped at the top, as shown at (8), to completely seal the ingredients within the formed package.

After the encapsulation of the food filler is completed, the assembled food product is placed on a working surface and shaped to a final length and width to form generally a cylindrical or oval-shaped dough pouch. The completed food product is then permitted to set for a predetermined period of time so that the dough sets and reaches a condition where, upon depression with a finger, the dough will slowly recover to its original shape. This setting is generally obtained in an atmosphere having a temperature of 80° F. and 75% humidity. The setting period will vary between 15 to 25 minutes.

As an alternate step, prior to the deep-frying step, the product may be subjected to an "egg wash". This consists of dipping the uncooked product into a batter consisting of beaten eggs and milk and salt or spices. This step will provide an improved texture and appearance of the outer surface of the product, after processing is completed.

As a next step, the product is placed into a bath of oil or other form of shortening which is maintained at a heated temperature of around 350° F. As the food product cooks, the lower portion of the food product in the oil bath will slightly puff, thereby increasing the volume of the submerged dough and making it thereby lighter, and causing the food product to roll over, if it is in a horizontal position, until the entire surface of the food product achieves a crust. The fried or cooked food product is removed after it reaches a golden brown exterior. Thereafter, the food product is placed on an absorbent horizontal surface to remove most of the oil from the food product.

The food product may be served to be eaten after a short "setting" period which will permit the cheese to change from a liquid to a plastic state within the product.

Alternatively, the product may be permitted to cool and then be placed in an oven for the purpose of further drying and crisping of the cooked dough outer shell of the product. This step will also make the cooked dough shell of the product more rigid or stiff, thereby adding to the ease of handling by the handle or stick. This step of the process would be done in an oven, with the product in a horizontal position for a period of approximately 5 minutes at a temperature of approximately 350° F.

For commercial applications, the process would involve, after the deep-oil cooking or frying step (or after the subsequent oven-baking step), the additional step of freezing. In a frozen state, the product can be packaged and distributed for retail sale. Upon purchase of the product in this state, the consumer would then place the product in an oven for 10 to 20 minutes at a temperature of 360° F. to 375° F., after which the product would be ready to eat.

Alternatively, the product, when purchased in a frozen state, might be introduced into a micro-wave oven for a short time, to place the product in readiness for eating.

In another alternative form of commercial utilization of the product, the freezing step could be replaced by a refrigeration step, whereby the product would be prepared in advance, and stored for a relatively short duration under refrigeration, until ordered by a customer, whereby it would be subjected to the oven process.

If production of the product on a volume basis is contemplated, the steps of "egg washing", deep-frying, setting, baking, and freezing, would all be performed on an automated basis, whereby the product, after formed, would be suspended or laid upon a conveyor which would carry a multitude of products through the various processing steps.

Having regard to the physical structure of the product, it can be seen that the supporting structure is formed of a handle or stick (1) and the disc (2). Both may be made of wood or a heat-resistant, non-toxic plastic, either in two separate pieces or in one integral piece. In the case of the former, the pieces are tightly force-fitted together to hold securely. The handle or stick (1) need not extend beyond the disc (2), and if so, only slightly, since the handle or stick is not necessary to provide the necessary rigidity or stiffness of the food product. Rather, it is the cooked dough and its crimped affixation to the handle and disc which provides the necessary integral interconnection for support.

What is claimed is:

1. A food product, comprising an elongated cooked dough crust body formed from an edible dough sheet and having an upper end and a lower end, said cooked dough crust body having an inner cavity that enclosed a food filler concentrically disposed in and axially along said elongated crust body, said elongated crust body having an upper crimped crusted end seal to prevent the escape of the upper portion of the food filler with the lower portion of said food filler being seated on a disc transverse to the longitudinal axis, said disc being initially placed a predetermined distance inwardly from an edge of said edible sheet to permit crimping of the edible sheet below said disc, said disc being enclosed in said crust body, a handle fixedly secured to said disc and extending out of said crust body and axially aligned with said elongated crust body, there being substantially no extension of said handle beyond one side of said disc into the food product and said crust body having a lower portion adhesively crimped to both said disc and to a portion of said handle that extends out of said crust body to seal the lower end of the dough body to prevent the escape of said food filler, the cooked dough and its crimped affixation to the handle and disc being sufficient to provide sufficient rigidity and self-support of the product without the need to extend the stick into the product beyond the disc.

2. A food product as claimed in claim 1, wherein said food filler is precooked meats, sausage, cheese, vegetables, or sauce.

3. A food product as claimed in claim 2, wherein said food filler comprises equal proportional amounts by weight of sauce and cheese and meat.

4. A food product as claimed in claim 1, wherein said disc is formed of an edible food material.

* * * * *